United States Patent
Lee

(10) Patent No.: US 7,110,079 B2
(45) Date of Patent: Sep. 19, 2006

(54) LIQUID CRYSTAL DISPLAY DEVICE AND METHOD OF FABRICATING THE SAME

(75) Inventor: Yun Bok Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 47 days.

(21) Appl. No.: 10/825,416

(22) Filed: Apr. 16, 2004

(65) Prior Publication Data

US 2005/0128412 A1    Jun. 16, 2005

(30) Foreign Application Priority Data

Dec. 16, 2003   (KR)   ............ 10-2003-0092133

(51) Int. Cl.
   *G02F 1/1343*   (2006.01)
(52) U.S. Cl. ............... 349/146; 349/129
(58) Field of Classification Search ........ 349/146, 349/141, 129
   See application file for complete search history.

(56) References Cited

U.S. PATENT DOCUMENTS

| | | | |
|---|---|---|---|
| 5,069,813 A | 12/1991 | Patel | |
| 5,434,687 A | 7/1995 | Kawata et al. | |
| 5,610,743 A | 3/1997 | Tsai | |
| 5,977,562 A * | 11/1999 | Hirakata et al. | 257/72 |
| 6,243,154 B1 * | 6/2001 | You et al. | 349/141 |
| 6,778,246 B1 * | 8/2004 | Sun et al. | 349/146 |
| 6,812,986 B1 * | 11/2004 | Takatori et al. | 349/141 |
| 2002/0036740 A1 * | 3/2002 | Kubo et al. | 349/129 |
| 2002/0075436 A1 * | 6/2002 | Kubo et al. | 349/129 |
| 2003/0053020 A1 | 3/2003 | Okada et al. | |
| 2005/0128405 A1 * | 6/2005 | Lee | 349/141 |
| 2005/0128406 A1 * | 6/2005 | Lee | 349/141 |

FOREIGN PATENT DOCUMENTS

| | | |
|---|---|---|
| JP | 09-325340 | 12/1997 |
| KR | 1999-0058889 | 7/1999 |

* cited by examiner

*Primary Examiner*—James Dudek
(74) *Attorney, Agent, or Firm*—McKenna Long & Aldridge LLP

(57) ABSTRACT

A liquid crystal display device includes gate and data lines on a first substrate and crossing each other to define a pixel region, a thin film transistor at a crossing of the gate and data lines, a pixel electrode connected to the thin film transistor and having a circular band shape, a common line on a second substrate spaced apart from and facing the first substrate, and a common electrode extending from the common line and having a circular band shape.

13 Claims, 11 Drawing Sheets

LIQUID CRYSTAL DISPLAY DEVICE AND METHOD OF FABRICATING THE SAME

This application claims the benefit of Korean Patent Application No. 2003-0092133, filed on Dec. 16, 2003, which is hereby incorporated by reference as if fully set forth herein.

BACKGROUND OF THE INVENTION

1. Field of the Invention

The present invention relates to a liquid crystal display device and a method of fabricating the same.

2. Discussion of the Related Art

A liquid crystal display device uses the optical anisotropy and polarization properties of liquid crystal molecules to produce an image. Liquid crystal molecules have a definite orientational alignment based their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light, thin and have low power consumption characteristics. The typical liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been developed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided with reference to FIG. 1.

FIG. 1 is a schematic cross-sectional view illustrating a concept of a related art IPS-LCD panel. As shown in FIG. 1, upper and lower substrates 10 and 20 are spaced apart from each other, and a liquid crystal layer 30 is interposed therebetween. The upper and lower substrates 10 and 20 are often referred to as an array substrate and a color filter substrate, respectively. On the lower substrate 20 are a common electrode 22 and a pixel electrode 24. The common and pixel electrodes 22 and 24 are aligned parallel to each other. On a surface of the upper substrate 10, a color filter layer (not shown) is commonly positioned in a position between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

Now the description will illustrate the operation of a related art IPS-LCD device. When no electric field is produced by the common and pixel electrodes 22 and 24, i.e., off-state, the longitudinal axes of the liquid crystal (LC) molecules 32 are parallel and form a definite angle with the common and pixel electrodes 22 and 24. For example, the longitudinal axes of the LC molecules 32 are arranged parallel with both the common and pixel electrodes 22 and 24.

On the contrary, when a voltage is applied to the common and pixel electrodes 22 and 24, i.e., on state, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field 26.

Therefore, the result is a wide viewing angle that ranges from about 80 to 85 degrees in up-and-down and left-and-right directions from a line vertical to the IPS-LCD panel, for example.

FIG. 2 is a plan view illustrating one pixel of an array substrate according to a related art IPS-LCD device. As shown, gate lines 40 are transversely arranged and data lines 42 are disposed substantially perpendicular to the gate lines 40. A common line 50 is also transversely arranged parallel with the gate line 40 and is spaced apart from the gate line 40. The gate line 40, the common line 50 and a pair of the data lines 42 define a pixel region P on the array substrate. A thin film transistor (TFT) is disposed a corner of the pixel region P near the crossing of the gate and data lines 40 and 42.

In each one pixel, three common electrodes 44 extend perpendicularly from the common line 50, and two of the common electrodes 44 are disposed next to the data lines 42, respectively. A pixel connecting line 48 is disposed next to the gate line 40 with being parallel with the gate line 40, and is electrically connected to the TFT T. Pixel electrodes 46 extend perpendicularly from the pixel connecting line 48 toward the common line 50. Each of the pixel electrodes 46 is disposed between two of the common electrodes 44 parallel with the data line 42. Each of areas I between the respective common electrodes 44 and the respective pixel electrodes 46 is defined as a block where the liquid crystal molecules are re-arranged by the electric fields. In FIG. 2, there are four blocks in one pixel.

As shown in FIG. 2, the IPS-LCD device according to the related art re-arranges and operates the liquid crystal molecules using the electric field generated parallel with the array substrate. Thus, it can provide a wider viewing angle as compared to the LCD device that forms the electric field perpendicular to the array substrate. Some additional modifications to the IPS-LCD device have been developed in order to further increase the viewing angle.

FIG. 3 is a plan view of an array substrate for use in an IPS-LCD device having multiple domains according to another related art. With reference to FIG. 3, some of detailed explanations previously explained with reference to FIG. 2, will be omitted in order to prevent duplicate explanations.

In FIG. 3, a pixel connecting line 58 is disposed over a common line 60. Common and pixel electrodes 54 and 56 are elongated from the common and pixel connecting lines 60 and 58, respectively, in an up-and-down direction. Both the common and pixel electrodes 54 and 56 have a zigzag shape with a plurality of bent portions, but they are parallel to each other and arranged alternately. The zigzag shape defines the multidomains in the pixel regions symmetrically to the bent portions of the common and pixel electrodes 54 and 56. These zigzag shapes and the multidomains provide improved viewing angle over the straight shape of FIG. 2.

Moreover in FIG. 3, the pixel connecting line 58 overlaps the common line 60, so that the overlapped area becomes a storage capacitor $C_{ST}$. Namely, the pixel connecting line 58 acts as one electrode of the storage capacitor $C_{ST}$, while the overlapped portion of the common line 60 acts as the other electrode of the storage capacitor $C_{ST}$. One of the pixel electrodes 56 is connected to a drain electrode 62 so that all of the pixel electrodes 56 can electrically communicate with the TFT T.

However, the IPS-LCD device having the above-mentioned multidomains has a problem of color shifting depending on the viewing angles, because the liquid crystal molecules have long and thin shapes.

FIG. 4 is a graph illustrating viewing angle properties of the IPS-LCD device having the zigzag structure of FIG. 3. The IPS-LCD device having the zigzag-shaped common and pixel electrodes has the improved viewing angles in directions of ±90 and ±180 degrees, i.e., in right-and-left and up-and-down directions, as illustrated by references IVa and IVb in FIG. 4. However, the viewing angles are degraded in directions of ±45 and ±135 degrees, i.e., in diagonal directions, as illustrated by references IVc and IVd in FIG. 4. Furthermore, the color shift also occurs depending on the viewing angles or directions.

When the voltages applied to the electrodes generate the electric fields between the common and pixel electrodes, the liquid crystal molecules rotate about 45 degrees in accordance with the electric fields. This causes gray inversion due to the rotation of the liquid crystal molecules. In particular, when the IPS-LCD is operated in gray mode, the IPS-LCD produces yellowish color in 45(+45) degrees declination with respect to the liquid crystal polarization because of the optical anisotropy properties of liquid crystal molecules. And the IPS-LCD also produces bluish color in 135(−45) degrees declination with respect to the liquid crystal polarization because of the optical anisotropy properties of the liquid crystal molecules.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device and a method of fabricating the same, which increase a viewing angle and prevent a color sift.

Another advantage of the present invention is to provide a liquid crystal display device and a method of fabricating the same, which provide uniform directions of liquid crystal molecules in all directions.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, exemplary embodiments in accordance with the principles of the present invention provides a liquid crystal display device including gate and data lines on a first substrate crossing each other to define a pixel region, a thin film transistor at a crossing of the gate and data lines, a pixel electrode connected to the thin film transistor and having a circular band shape, a common line on a second substrate spaced apart from and facing the first substrate, and a common electrode extending from the common line and having a circular band shape.

In another aspect, a method of fabricating a liquid crystal display device includes forming a pixel electrode of a circular band shape on a first substrate, forming a common electrode of a circular band shape on a second substrate, attaching the first and second substrates such that the common electrode is alternatively arranged with the pixel electrode, and injecting a liquid crystal material between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the present invention and together with the description serve to explain the principles of that invention.

In the drawings.

DETAILED DESCRIPTION OF THE ILLUSTRATED EMBODIMENTS

Reference will now be made in detail to illustrated exemplary embodiments of the present invention, examples of which are shown in the accompanying drawings. Wherever possible, similar reference numbers will be used throughout the drawings to refer to the same or similar parts.

Figure 1:
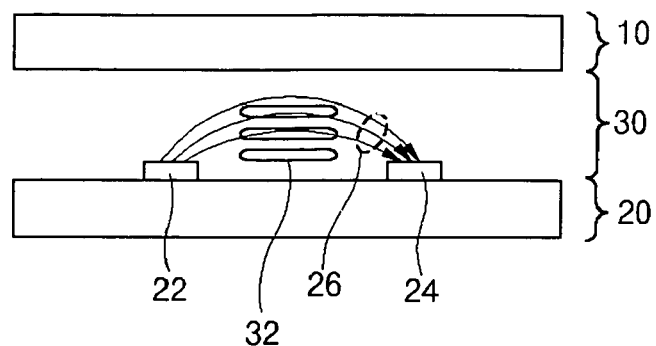
FIG. 1 is a schematic cross-sectional view illustrating a concept of a related art IPS-LCD panel.
Figure 2:
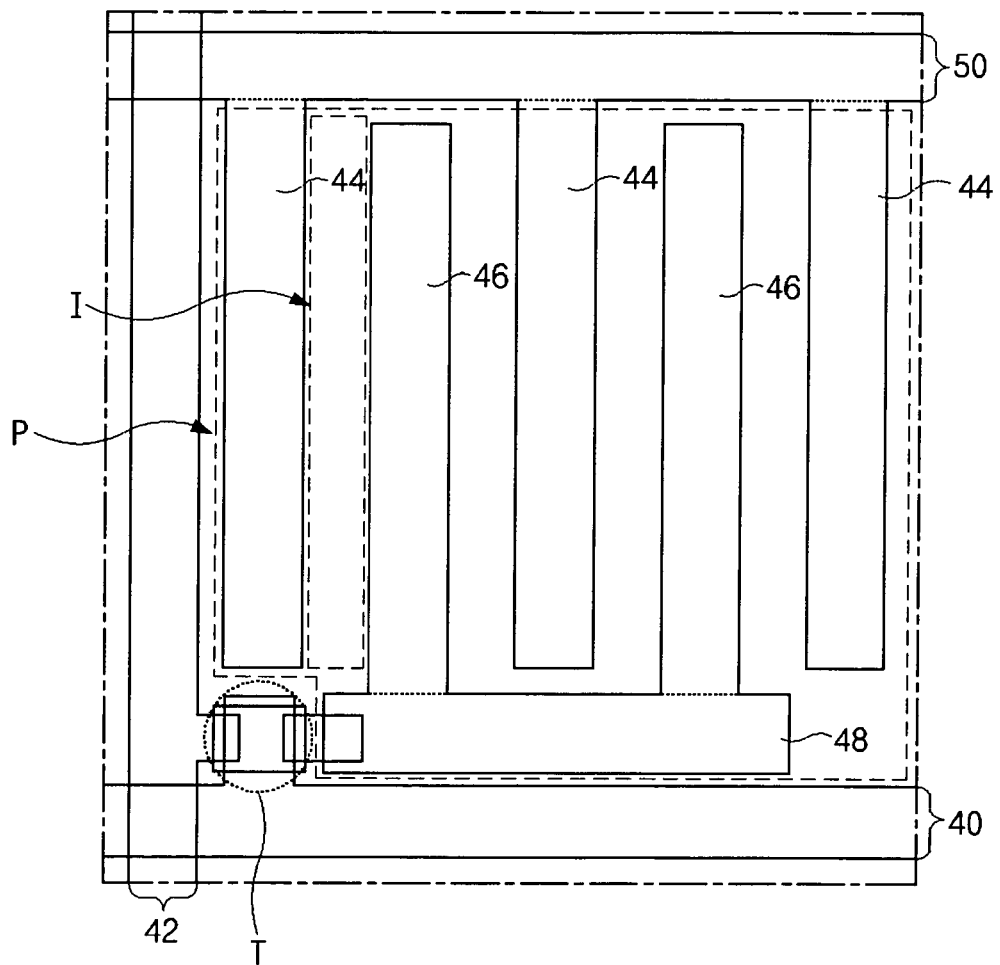
FIG. 2 is a plan view illustrating one pixel of an array substrate according to a related art IPS-LCD device.
Figure 3:
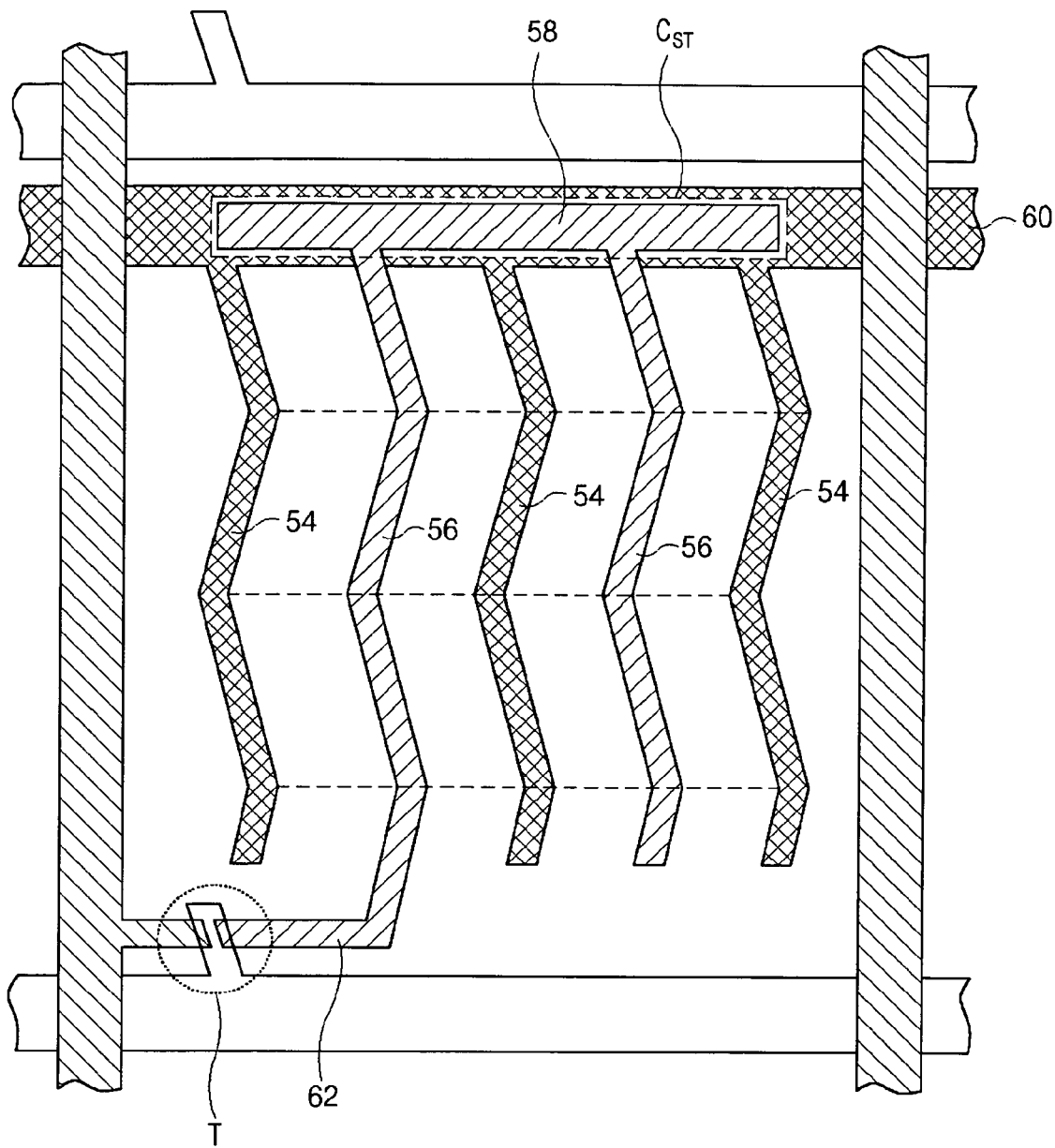
FIG. 3 is a plan view illustrating an array substrate for use in an IPS-LCD device having multiple domains according to another related art.
Figure 4:
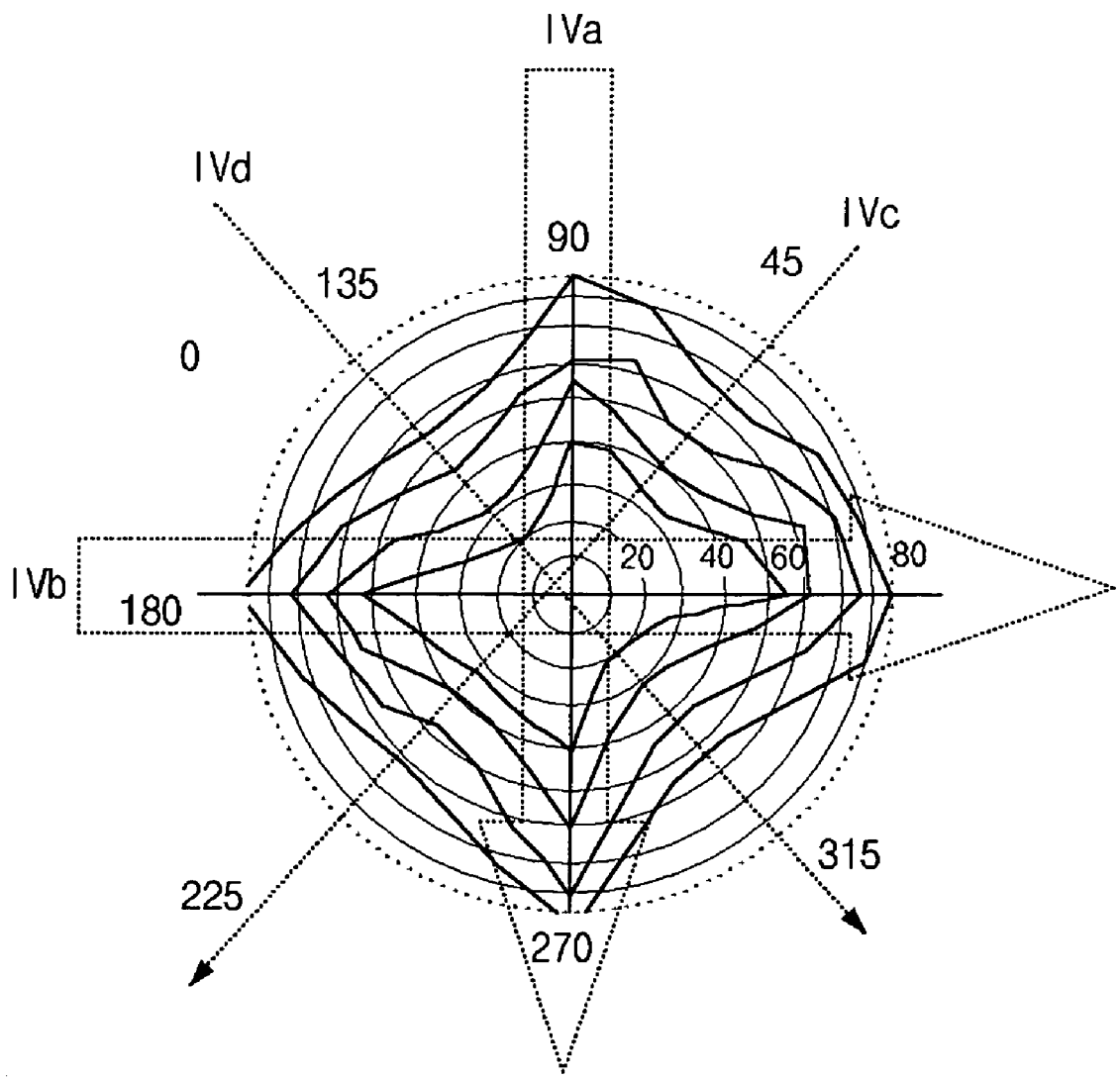
FIG. 4 is a graph illustrating a viewing angle of the IPS-LCD device having the zigzag structure of FIG. 3.
Figure 5A:
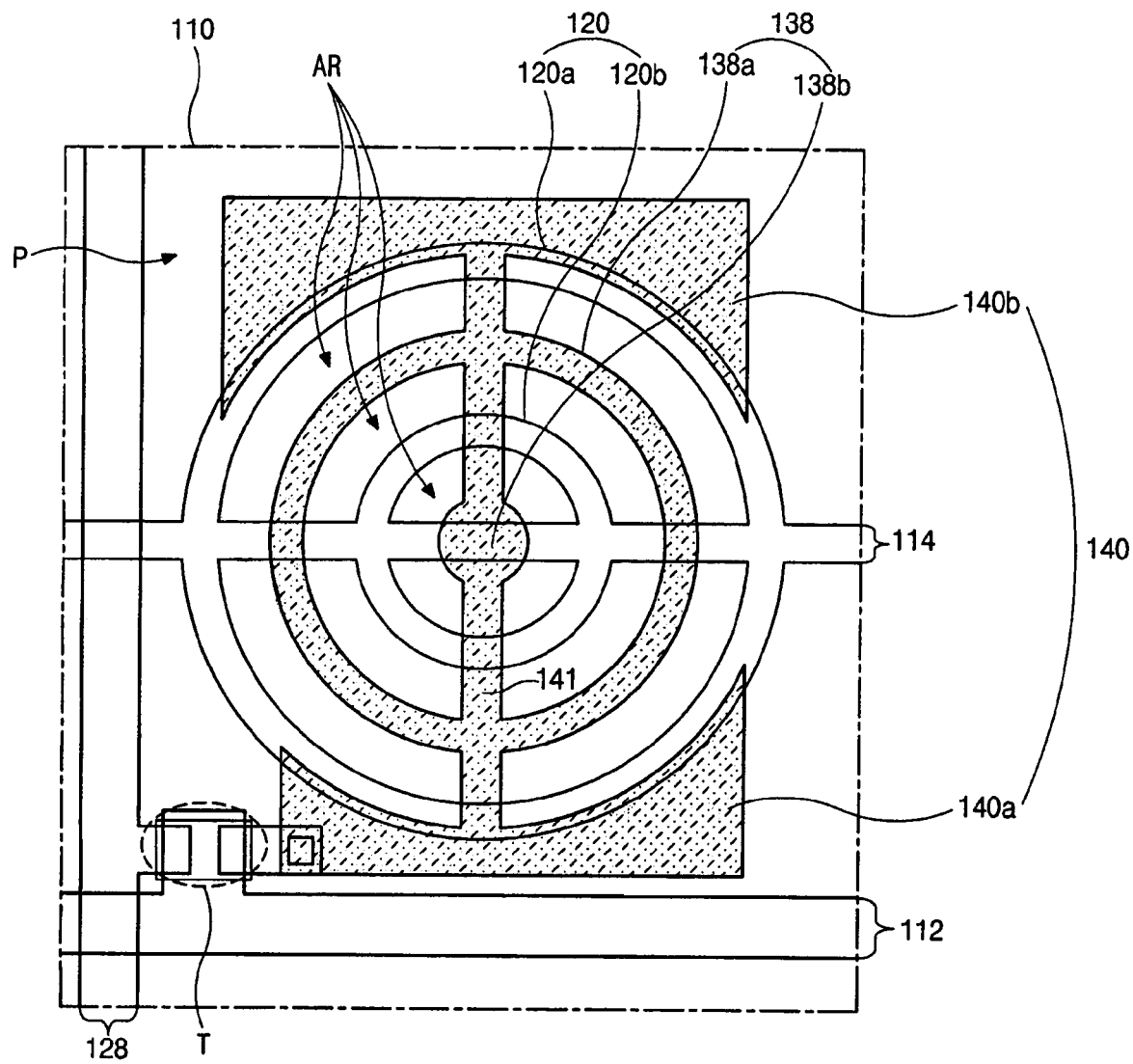
FIGS. 5A and 5B are plan views illustrating a liquid crystal display device according to a first embodiment of the present invention.
Figure 5B:
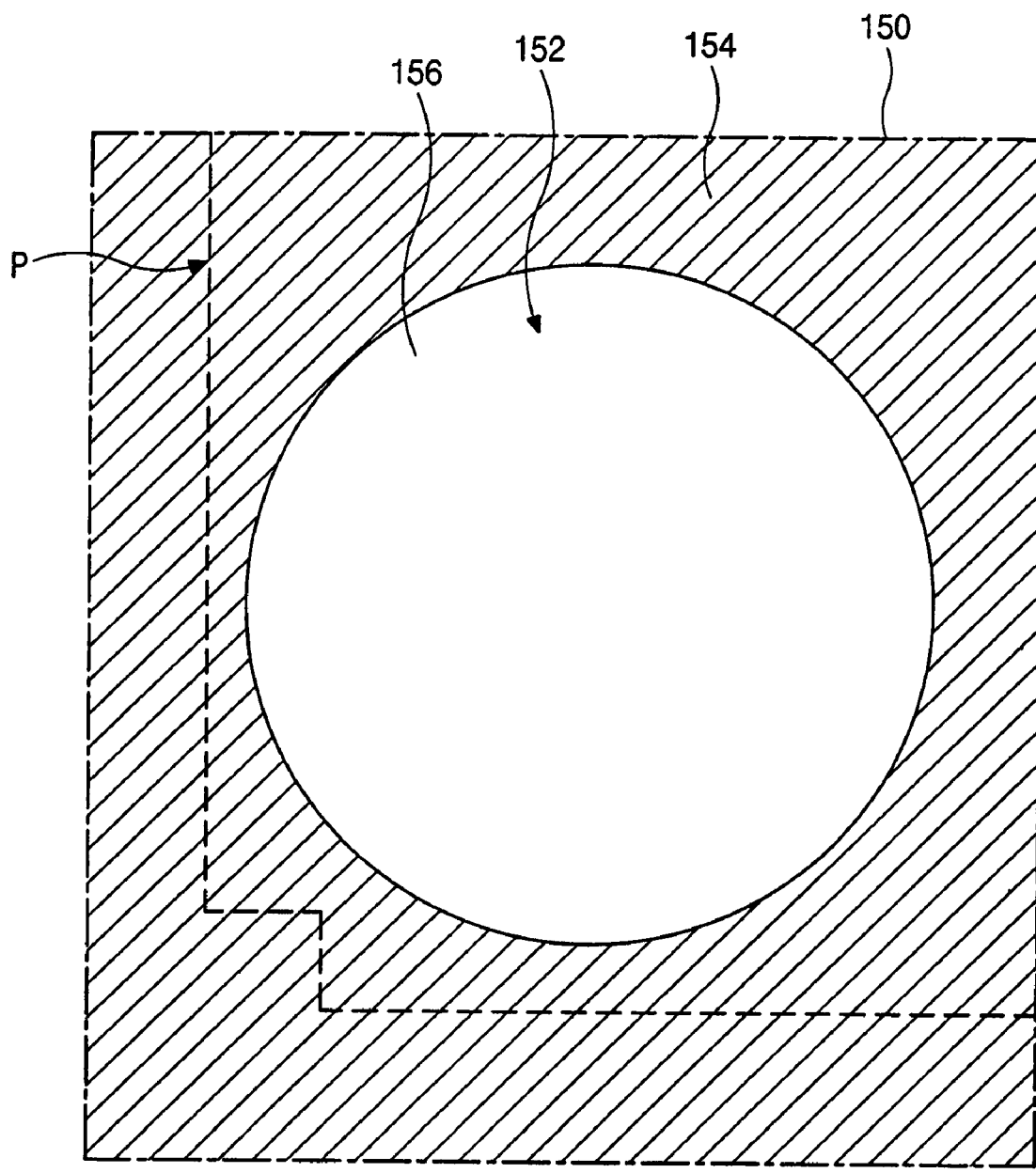

FIGS. 5A and 5B are plan views illustrating a liquid crystal display device according to a first exemplary embodiment of the present invention. FIG. 5A shows an array substrate including a thin film transistor and FIG. 5B shows a color first substrate facing the array substrate. In the first embodiment of the present invention, common and pixel electrodes have a circular band or circular band shape.

As shown in FIG. 5A, on a first substrate 110, a gate line 112 is formed in a first direction and a data line 128 is formed in a second direction crossing the first direction. A common line 114 is formed in the first direction to be spaced apart from the gate line 112. It is understood that line refers to a structure that carries signal. It does not refer to or limit the shape of that structure. A thin film transistor (TFT) T is disposed at a crossing of the gate and data lines 112 and 128. The gate and data lines 112 and 128 define a pixel region P.

In the pixel region P, a pixel electrode 138 and a common electrode 120 are formed. The common electrode 120 extends from the common line 114 and has a circular band shape. The pixel electrode 138 of a circular band shape is spaced apart from the common electrode 120 and is connected to the thin film transistor T.

A space between the common electrode 120 and the pixel electrode 138 is defined as an opening area AR, which also has a circular band shape by the common electrode 120 and the pixel electrode 138.

More particularly, the common electrode 120 includes a first common electrode pattern 120a disposed in the outer portion of the pixel region P and a second common electrode pattern 120b inside the first common electrode pattern 120a. The first and second common electrode patterns 120a and 120b are shaped like a circular band and extend from the common line 114.

The pixel electrode 138 includes first and second pixel electrode patterns 138a and 138b. The first pixel electrode pattern 138a having a circular band shape is disposed between the first and second common electrode patterns 120a and 120b, and the second pixel electrode pattern 138b having a circular shape is disposed inside the circular band-shaped second common electrode pattern 120b.

A capacitor electrode 140 spaced apart from the first pixel electrode pattern 138a is formed in an area where the first common electrode pattern 120a is disposed such that the capacitor electrode 140 overlaps the first common electrode pattern 120a and constitutes a storage capacitor with the overlapped portions of the first common electrode pattern 120a. The capacitor electrode 140 includes a first capacitor electrode pattern 140a and a second capacitor electrode pattern 140b, respectively, in bottom and top portions of the pixel region P. The first capacitor electrode pattern 140a is connected to the second capacitor electrode pattern 140b through a pixel connecting line 141 and the second capacitor electrode pattern 140b is connected to the thin film transistor T.

The pixel connecting line 141 is formed parallel to the data line 128 in the middle of the pixel region P and connects the first and second capacitor electrode patterns 140a and 140b. Furthermore, the pixel connecting line 141 also connects the first pixel electrode pattern 138a to the second pixel electrode pattern 138b. Accordingly, the pixel electrode 138, the capacitor electrode 140 and the pixel connecting line 141 may be formed as one body in the same patterning process.

In FIG. 5B, a black matrix 154 is formed on a second substrate 150. The black matrix 154 has a circular opening 152 exposing the main portion of the pixel region P. A color filter layer 156 is formed on the black matrix 154. The color filter layer 156 covers the circular opening 152 and partially overlaps the black matrix 154. Although not shown in. detail, the color filter layer 156 is composed of red, green and blue sub-color filters, each of which is sequentially arranged in each pixel region P. There is no electrode on the second substrate 150.

Figure 6:
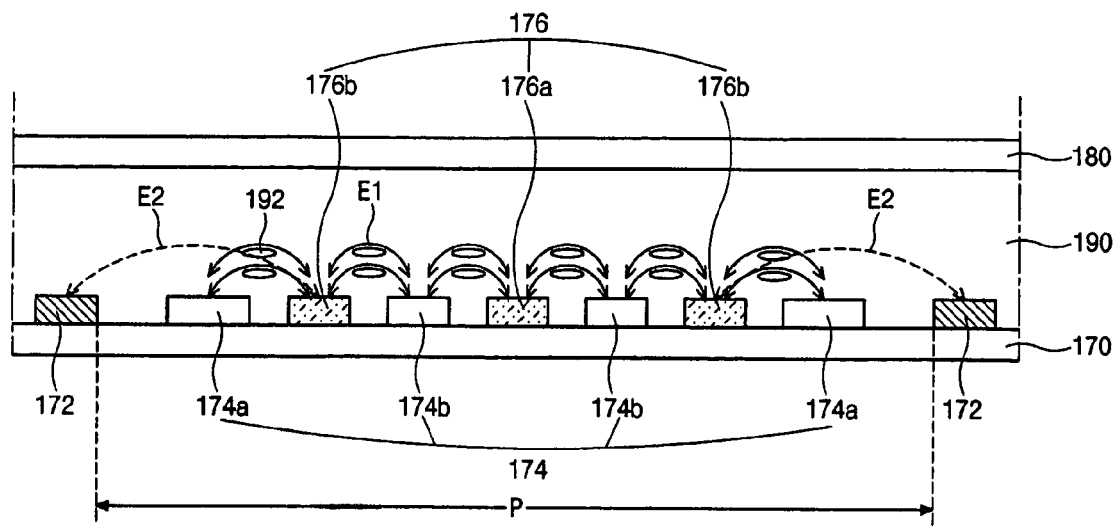
FIG. 6 is a schematic cross-sectional view illustrating the liquid crystal display device according to the first embodiment of the present invention.

FIG. 6 is a schematic cross-sectional view of the liquid crystal display device according to the first embodiment of the present invention, and shows characteristics of an electric field induced between pixel and common electrodes.

As shown in the figure, adjacent data lines 172 are disposed on a first substrate 170, and a pixel region P is defined between the adjacent data lines 172. A common electrode 174 and a pixel electrode 176 are formed in the pixel region P to be spaced apart from each other. The common electrode 174 includes a plurality of common electrode patterns 174a and 174b and the pixel electrode 176 includes a plurality of pixel electrode patterns 176a and 176b. The common electrode patterns 174a and 174b are alternatively arranged with the pixel electrode patterns 176a and 176b. A second substrate 180 is disposed over the first substrate 170 and a liquid crystal layer 190 is interposed between the first and second substrates 170 and 180.

In the embodiment, when voltage is applied, a lateral electric field E1 is induced between the common electrode 174 and the pixel electrode 176. Thus, liquid crystal molecules 192 are driven horizontally with respect to the substrates 170 and 180 by the lateral electric field E1, and view angles may be widened.

However, an electric field E2 is also induced between the data line 172 and the pixel electrode 176 to cause cross talk, which lowers image quality. To reduce the cross talk, since the outer common electrode pattern 174a should have a wider width than the inner common electrode pattern 174b, an aperture ratio is lowered.

The common electrode 174 and the pixel electrode 176 may be formed through the same process or through different processes, and the common electrode 174 and the pixel electrode 176 may be shortened depending on process conditions. Additionally, because the common electrode 174 and the pixel electrode 176 should be spaced apart from each other to reduce the cross talk, there is a limitation on increasing the aperture ratio.

Figure 7A:
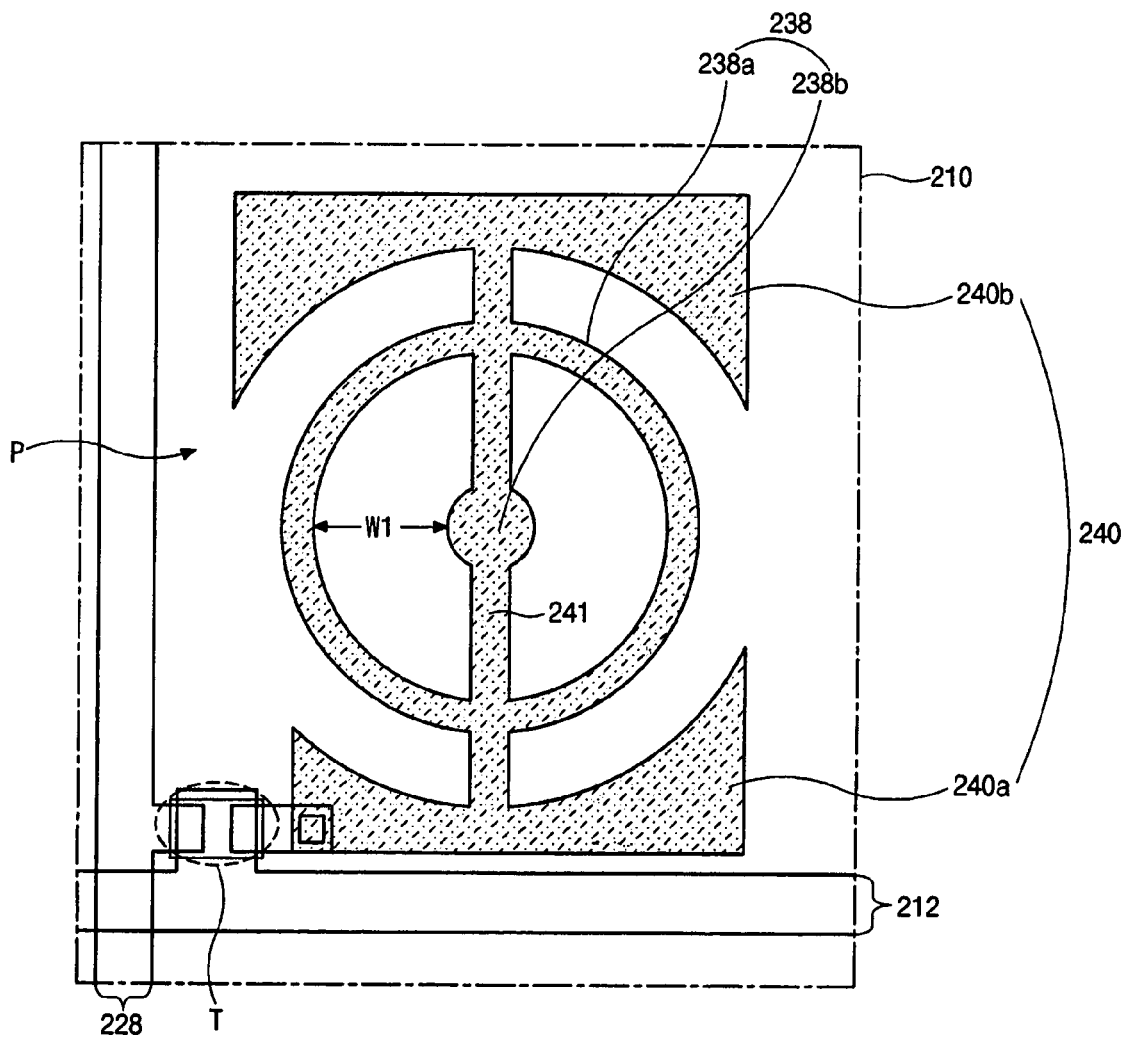
FIGS. 7A and 7B are plan views illustrating a liquid crystal display device according to a second embodiment of the present invention.
Figure 7B:
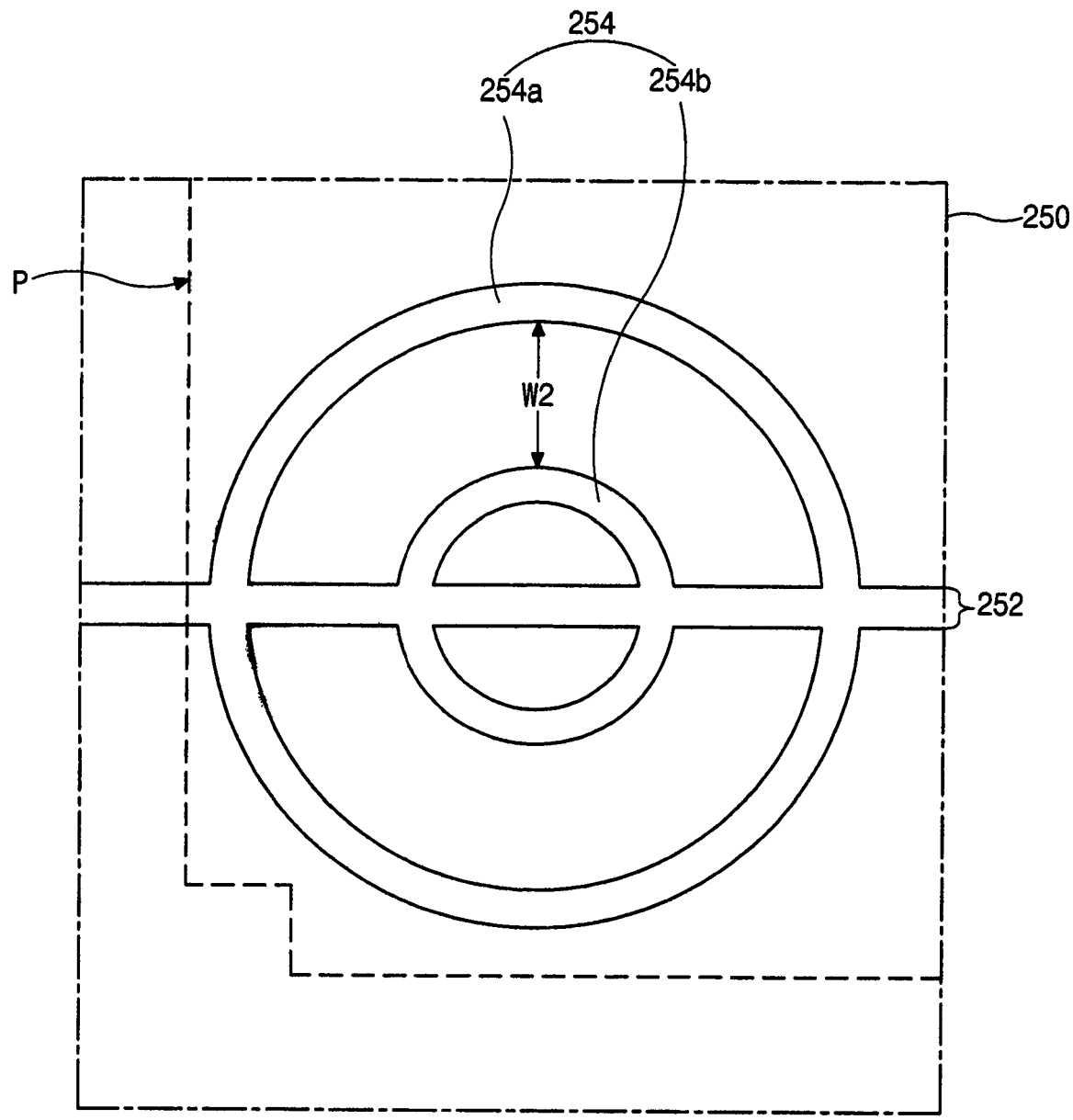

FIGS. 7A and 7B are plan views illustrating a liquid crystal display device according to a second embodiment of the present invention. FIG. 7A shows an array substrate including a thin film transistor and FIG. 7B shows a color first substrate facing the array substrate.

In FIG. 7A, a common line and a common electrode may be omitted as compared with FIG. 5A, and other elements may have the same structures as elements of FIG. 5A.

As shown in FIG. 7A, on a first substrate 210, a gate line 212 and a data line 228 cross each other to define a pixel region P. A thin film transistor (TFT) T is disposed at a crossing of the gate and data lines 212 and 228.

A pixel electrode 238 is formed in the pixel region P. The pixel electrode 238 includes a first pixel electrode pattern 238a having a circular band shape and a second pixel electrode pattern 238b having a circular shape. The second pixel electrode pattern 238b is disposed inside the first pixel electrode pattern 238a.

A capacitor electrode 240 is formed outside the pixel electrode 238 and is spaced apart from the first pixel electrode pattern 238a. A space between the capacitor electrode 240 and the pixel electrode 238 may have a substantially circular band structure. The capacitor electrode 240 includes a first capacitor electrode pattern 240a and a second capacitor electrode pattern 240b, respectively, in bottom and top portions of the pixel region P in the context of the figure. The first capacitor electrode pattern 240a is connected to the second capacitor electrode pattern 240b through a pixel connecting line 241 and the second capacitor electrode pattern 240b is connected to the thin film transistor T.

The pixel connecting line 241 is formed parallel to the data line 228 in the middle of the pixel region P and connects the first and second capacitor electrode patterns 240a and 240b. Furthermore, the pixel connecting line 241 also connects the first pixel electrode pattern 238a to the second pixel electrode pattern 238b. Accordingly, the pixel electrode 238, the capacitor electrode 240 and the pixel connecting line 241 may be formed as one united body at the same patterning process.

In FIG. 7B, a common line 252 is formed in a direction on a second substrate 250, and a common electrode 254 is formed in the pixel region P, which corresponds to the pixel region P of FIG. 7A. The common electrode 254 includes a first common electrode pattern 254a disposed in the outer portion of the pixel region P and a second common electrode pattern 254b inside the first common electrode pattern 254a. The first and second common electrode patterns 254a and 254b are shaped like a circular band and extend from the common line 252.

When the first substrate 210 including the pixel electrode 238 is aligned with the first substrate 250 including the common electrode 254, the first common electrode pattern 254a overlaps the first and second capacitor electrode patterns 240a and 240b, and is disposed outside the first pixel electrode pattern 254. The second common electrode pattern 254b is disposed between the first and second pixel electrode patterns 238a and 238b.

A first minimum width W1 of a space between the first and second pixel electrode patterns 238a and 238b corresponds to a second minimum width W2 of a space between the first and second common electrode patterns 254a and 254b.

Although not shown in the figure, a black matrix and a color filter layer may be formed on the second substrate 250. The black matrix has a circular opening exposing the common electrode 254 and covers an edge of the first common electrode pattern 254a.

Figure 8:
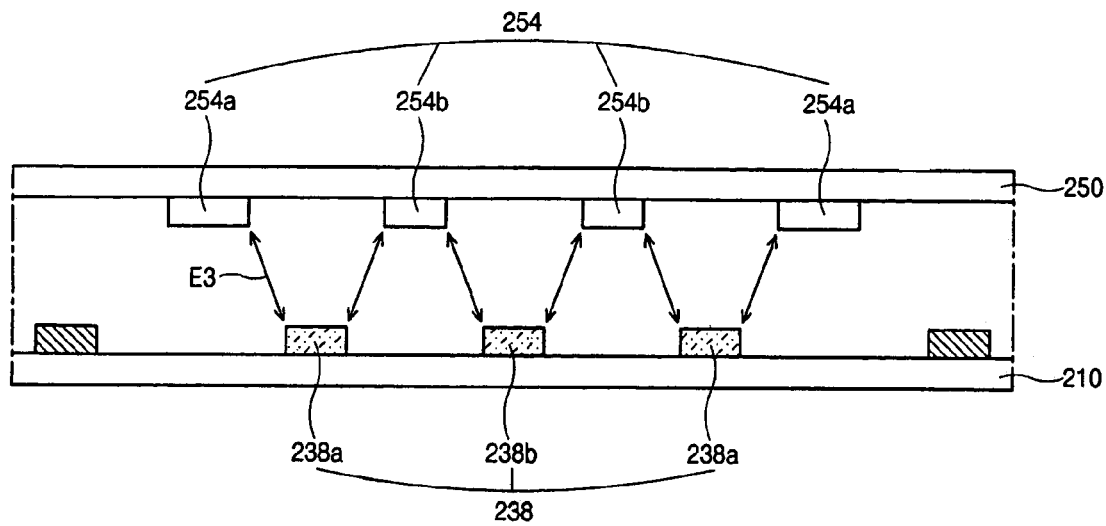
FIG. 8 is a schematic cross-sectional view illustrating the liquid crystal display device according to the second embodiment of the present invention.

FIG. 8 is a schematic cross-sectional view of the liquid crystal display device according to the second embodiment of the present invention, and shows characteristics of an electric field induced between pixel and common electrodes.

As shown in FIG. 8, a pixel electrode 238, which includes first and second pixel electrode patterns 238a and 238b, is formed on a first substrate 210. A common electrode 254, which includes first and second common electrode patterns 254a and 254b, is formed on a second substrate 250, which is disposed over and faces the first substrate 210. The first common electrode pattern 254a is disposed outside the first pixel electrode pattern 238a, and the second common electrode pattern 254b is disposed between the first and second pixel electrode patterns 238a and 238b.

When voltage is applied to the pixel and common electrodes 238 and 254, an electric field E3, which is inclined with respect to the substrates 210 and 250, is induced between the pixel and common electrodes 238 and 254, and thus liquid crystal molecules (not shown) are driven by the electric field E3. The intensity and direction of the electric field E3 may be controlled by adjusting a distance between the pixel electrode 248 and the common electrode 254.

In the related art liquid crystal display device, the liquid crystal may be driven by a vertical electric field induced between a pixel electrode, which is formed at each pixel on a first substrate, and a common electrode, which is formed on an entire surface of a second substrate facing the first substrate. On the other hand, in the second exemplary embodiment of the present invention, although the pixel electrode and the common electrode are formed on different substrates, both the pixel electrode and the common electrode are patterned at each pixel such that patterns of the common electrode are alternatively arranged with patterns of the pixel electrode. Thus, the liquid crystal may be driven by an electric field induced between the pixel and common electrodes, which may be inclined with respect to the substrates. The liquid crystal display device of the second embodiment may have a larger aperture ratio than that of the first embodiment.

Figure 9:
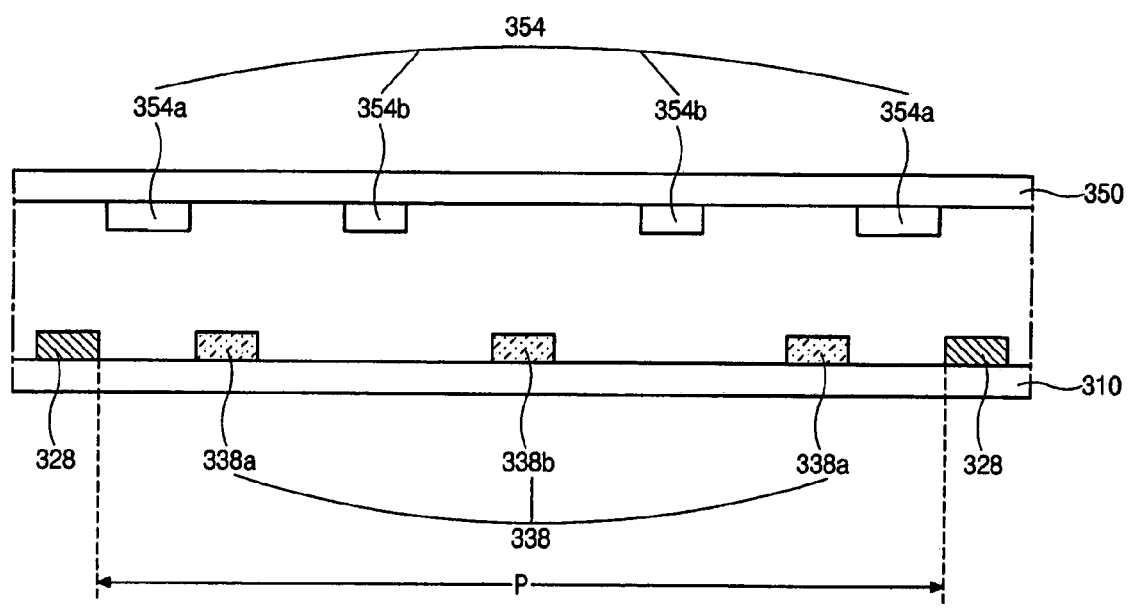
FIG. 9 is a schematic cross-sectional view illustrating a liquid crystal display device according to a third embodiment of the present invention.

FIG. 9 is a schematic cross-sectional view of a liquid crystal display device according to a third embodiment of the present invention. In the third embodiment, a common electrode is formed on a substrate facing an array substrate, which includes a thin film transistor, such that an outer pattern of the common electrode corresponds to a data line of the array substrate to improve the aperture ratio.

In FIG. 9, adjacent data lines 328 are formed on a first substrate 310, and a pixel region P is defined between the adjacent data lines 328. A pixel electrode 338, which includes first and second pixel electrode patterns 338a and 338b, is formed in the pixel region P on the first substrate 310. A common electrode 354, which includes first and second common electrode patterns 354a and 354b, is formed on a second substrate 350, which is disposed over and faces the first substrate 310. In the third embodiment, since the common electrode 354 and the data line 328 are formed on different substrates and electric interference between the common electrode 354 and the data line 328 is minimized, the common electrode 354 can be formed to correspond to the data line 328, and thus an aperture area may be widened.

Accordingly, in FIG. 9, the first common electrode pattern 354a is formed to overlap the data line 328, and a distance between the common electrode 354 and the pixel electrode 338 may be lengthened to increase the aperture ratio.

Meanwhile, Ag dots may be further formed on the common electrode 354 to apply signals from an outer integrated circuit (not shown) to the common electrode 354.

Figure 10A:
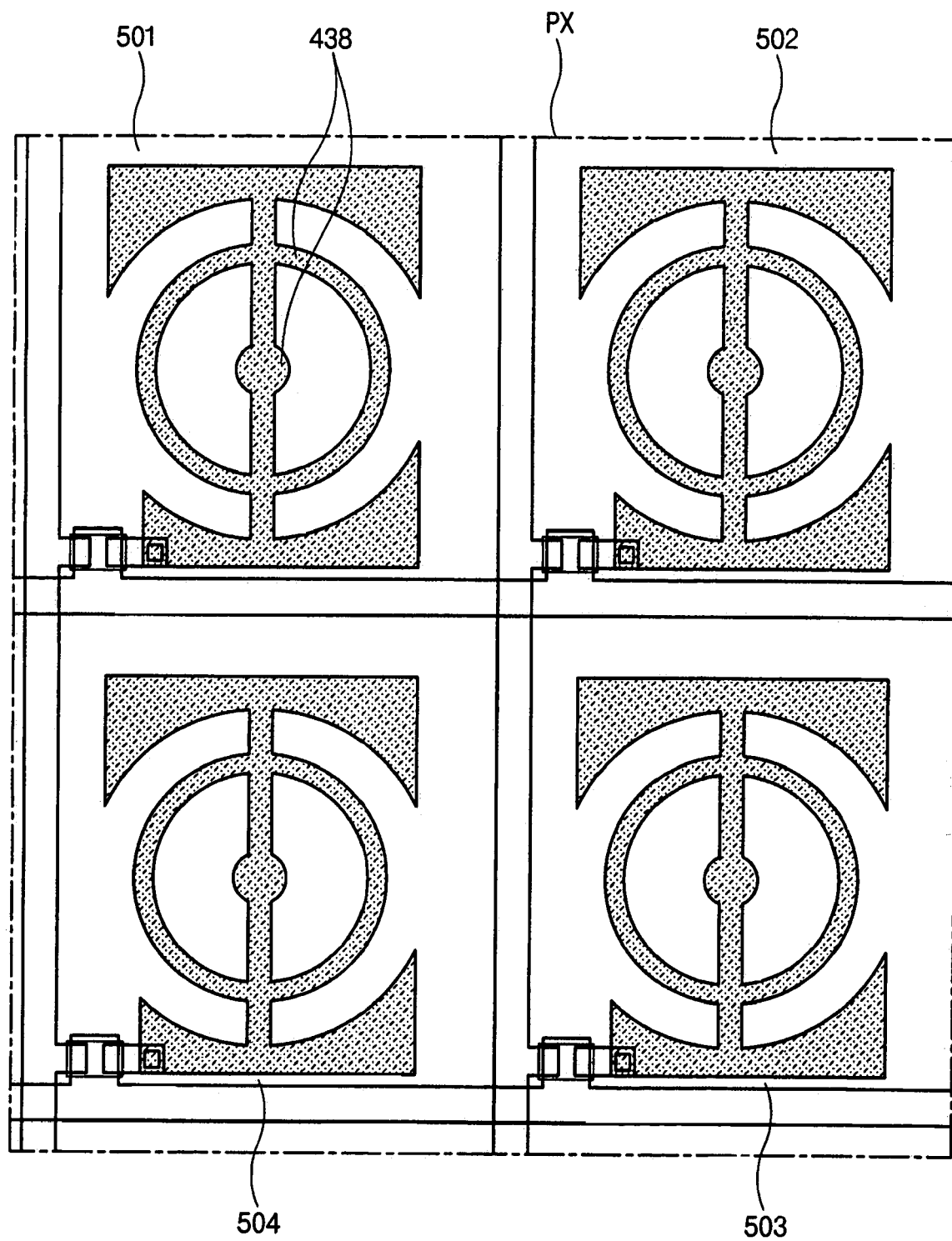
FIGS. 10A and 10B are plan views illustrating a liquid crystal display device according a fourth embodiment of the present invention.
Figure 10B:
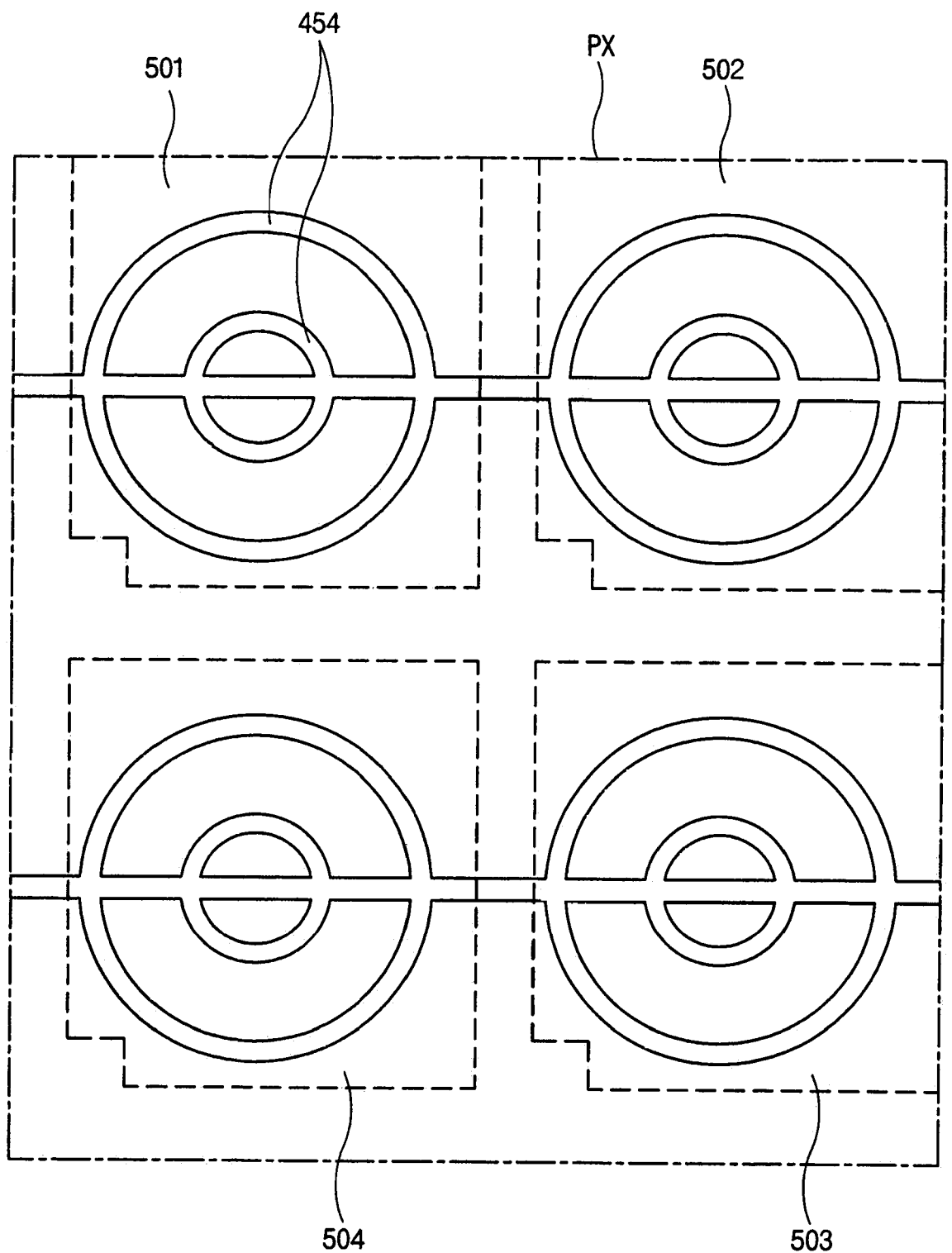

FIGS. 10A and 10B are plan views illustrating a liquid crystal display device according a fourth embodiment of the present invention. FIG. 10A shows an array substrate including a thin film transistor, and FIG. 10B shows a color filter substrate facing the array substrate. In the present invention, the common and pixel electrodes have a circular band shape, and one pixel is comprised of four sub-pixels (red, green, blue and white sub-pixels). Each sub-pixel has a perfect square structure, and thus the pixel also has a perfect square structure. A pixel for the liquid crystal display device of the fourth embodiment has the same structure as that of the second embodiment.

As shown in FIGS. 10A and 10B, one pixel PX includes four sub-pixels 501, 507, 503 and 504 of red, green, blue and white respectively. In FIG. 10A, each sub-pixel 501, 502, 503 and 504 has a circular pixel electrode 438, which is described in FIG. 7A. In FIG. 10B, each sub-pixel 501, 502, 503 and 504 has a circular common electrode 454, which is described in FIG. 7B.

The fourth embodiment includes a with a square shape, because a region that is not used as an aperture area may be minimized, and the aperture ratio may be more improved.

Figure 11:
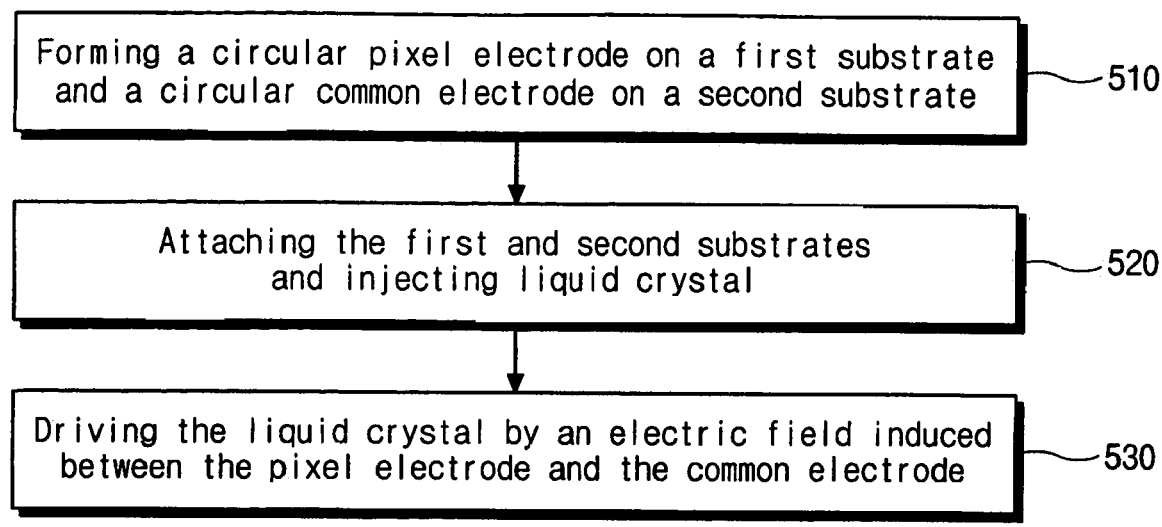
FIG. 11 is a flow chart of illustrating a manufacturing process of a liquid crystal display device according to the present invention.

FIG. 11 is a flow chart of illustrating a manufacturing process of a liquid crystal display device according to the present invention.

At step 510, pixel and common electrodes of a circular band shape are formed on first and second substrates, respectively. For example, if an array substrate including a thin film transistor is referred to as a first substrate and a color filter substrate facing the array substrate is referred to as a second substrate, the pixel electrode is formed on the first substrate to connected to the thin film transistor and the common electrode is formed on the second substrate to extend from a common line at each pixel.

At step 520, the first and second substrates are attached to each other and liquid crystal is injected between the first and second substrates. The pixel and common electrodes are alternatively arranged and a space between the pixel and common electrodes has a circular band shape.

At step 530, images are displayed by driving the liquid crystal by an electric field induced between the pixel and common electrodes. Since the electric field is inclined with respect to the substrates, the aperture ratio of the liquid crystal display device is improved. In addition, the pixel and common electrodes have a circular band shape, and an aperture area between the pixel and common electrodes also has a circular band shape. Therefore, because directors of the liquid crystal are equal in the aperture area, improved image qualities may be obtained and the viewing angles may be widened due to a multi-domain.

In the present invention, the common electrode is formed on the color filter substrate, which faces the array substrate, and thus short circuits between the electrodes may be prevented. Because there is almost no electric interference between the common electrode and the data line, the common electrode may be formed to overlap the data line, and the aperture ratio may be effectively increased.

Meanwhile, the pixel electrode and the common electrode may have an elliptical shape.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   gate and data lines on a first substrate and crossing each other defining a pixel region;
   a thin film transistor at a crossing of the gate and data lines;
   a pixel electrode on a first substrate connected to the thin film transistor and having a circular band shape;
   a common line on a second substrate spaced apart from and facing the first substrate; and
   a common electrode in the shape of a circular band extending from the common line,
   wherein the pixel region has a substantially rectangular structure, and wherein the liquid crystal display device includes a pixel having red, green, blue and white sub-pixels, wherein each sub-pixel corresponds to the pixel region.

2. The device of claim 1, wherein the common electrode alternates with the pixel electrode.

3. The device of claim 1, wherein the common electrode includes first and second common electrode patterns and the pixel electrode includes first and second pixel electrode patterns, wherein the first pixel electrode pattern is disposed between the first and second common electrode patterns and the second pixel electrode pattern is disposed inside the second common electrode pattern.

4. The device of claim 3, wherein a first space between the first and second common electrode patterns is equal to a second space between the first and second pixel electrode patterns.

5. The device of claim 1, wherein the pixel and common electrodes have an elliptical shape.

6. The device of claim 1, further comprising a black matrix and a color filter layer on the second substrate, wherein the color filter layer includes red, green and blue sub-color filters.

7. The device of claim 6, wherein the black matrix includes an opening exposing the pixel and common electrodes.

8. The device of claim 6, wherein the black matrix overlaps an edge of the common electrode.

9. The device of claim 1, wherein a portion of the common line is parallel to the gate line.

10. A method of fabricating a liquid crystal display device, comprising:
    forming a pixel electrode of a circular band shape on a first substrate;
    forming a common electrode of a circular band shape on a second substrate;
    attaching the first and second substrates such that the common electrode alternates with the pixel electrode; and
    injecting a liquid crystal material between the first and second substrates,
    wherein the pixel region has a substantially rectangular structure, and wherein the liquid crystal display device includes a pixel having red, green, blue and white sub-pixels, wherein each sub-pixel corresponds to the pixel region.

11. The method of claim 10, further comprising a thin film transistor on the first substrate, wherein the thin film transistor is connected to the pixel electrode.

12. The method of claim 10, wherein a space between the pixel electrode and the common electrode has a circular band shape.

13. The method of claim 10, further comprising forming Ag dots on the common electrode.

* * * * *